United States Patent [19]

Hubbell

[11] Patent Number: 5,750,175
[45] Date of Patent: May 12, 1998

[54] GEL TEXTURED HONEY PRODUCT

[76] Inventor: Brenda C. Hubbell, 2016 Tooles Bend Rd., Knoxville, Tenn. 37922

[21] Appl. No.: 635,775

[22] Filed: Apr. 22, 1996

[51] Int. Cl.$^6$ ........................................... A23L 1/08
[52] U.S. Cl. ........................................... 426/573; 426/658
[58] Field of Search ................................ 426/658, 573

[56] References Cited

U.S. PATENT DOCUMENTS

| | | |
|---|---|---|
| 1,646,657 | 10/1927 | O'Connell . |
| 1,686,556 | 4/1928 | Griswold . |
| 1,987,893 | 1/1935 | Dyce . |
| 2,052,358 | 8/1936 | Lund . |
| 2,295,274 | 8/1942 | Walker . |
| 3,857,975 | 12/1974 | Misaki et al. . |
| 4,004,040 | 1/1977 | Puta . |
| 4,273,794 | 6/1981 | von Stering-Krugheim ........... 426/590 |
| 4,326,052 | 4/1982 | Kang et al. . |
| 4,326,053 | 4/1982 | Kang et al. . |
| 4,503,084 | 3/1985 | Baird et al. . |
| 4,517,216 | 5/1985 | Shim . |
| 4,532,143 | 7/1985 | Brain et al. . |
| 4,563,366 | 1/1986 | Baird et al. . |
| 4,647,470 | 3/1987 | Sanderson et al. . |
| 4,849,240 | 7/1989 | Giddey et al. . |
| 4,869,916 | 9/1989 | Clark et al. . |
| 4,876,105 | 10/1989 | Wolf et al. . |
| 5,112,455 | 5/1992 | Cozzette et al. . |
| 5,158,800 | 10/1992 | Bell ........................................... 426/660 |
| 5,468,513 | 11/1995 | Fackrell et al. ........................... 426/663 |
| 5,597,604 | 1/1997 | Chalupa et al. ........................... 426/594 |

OTHER PUBLICATIONS

A Comprehensive Survey Honey; Chapter 15, pp. 378–379. Published in co–operation with the Bee Research Association; Edited by Eva Crane, MSc PHd.

Encyclopedia of Food Technology; Encyclopedia of Food Technology and Food Science Series, vol. 2; Arnold J. Johnson, Ph.D. and Martin S. Peterson, Ph.D.; The Avi Publishing Company, Inc., Westport, Connecticut 1974.

Encyclopedia of Food Science; Martin S. Peterson Ph.D., Arnold H. Johnson, Ph.D.; Fruit Preserves and Jellies, pp. 469–471; Pectin Substances pp. 610–612; Sugars and Sweeteners, pp. 867–873.

Gum Technology in the Food Industry; Martin Glicksman; Pectins pp. 159–181.

Product Brochure: Gellam Gum; Multi–functional Polysaccharide for Gelling and Texturing; Merck & Co., Inc., Kelco Division.

*Primary Examiner*—Anthony J. Weier
*Attorney, Agent, or Firm*—Luedeka, Neely & Graham, P.C.

[57] ABSTRACT

The viscous fluid texture of natural honey is modified to a medium soft gel with excellent flavor release by combining the honey with gellan gum, distilled water, and anhydrous sodium citrate.

8 Claims, No Drawings

GEL TEXTURED HONEY PRODUCT

BACKGROUND OF THE INVENTION

The present invention relates to a gelatinized honey food composition. More particularly, the present invention relates to a honey product having a modified texture resembling a clear jelly but with a full, naturally rich flavor.

Natural honey is the sweet, aromatic, viscous syrup produced by the honeybee from the nectar of flowers. A combined evaporation and sucrose inversion is brought about by the addition of bee enzymes and physical manipulation of the nectar in the hive. As the ripened nectar reaches a solids content of from about 80 percent to about 82 percent, the cells of the comb in which it is deposited are sealed over with beeswax and the honey thus preserved is stored for maintenance of the colony during the winter.

The color and flavor of honey is closely related to the flower from which it originates. About 25 floral types of honey are commercially important. These range in color from nearly water-white (sweet clover) to dark amber (aster-goldenrod) and in flavor from very mild (fireweed, clovers) to pronounced (buckwheat, tulip poplar).

Honey is generally considered to be a highly concentrated solution of simple sugars having the following physical characteristics: high viscosity, stickiness, great sweetness, high density, hygroscopicity and relative immunity from spoilage. Table I provides an average gross composition of United States honey (wt %).

TABLE I

| | |
|---|---|
| Water | 17.20% |
| Fructose | 38.19 |
| Glucose | 31.28 |
| Sucrose | 1.31 |
| Reducing disaccharides | 7.31 |
| Higher Sugars | 1.50 |
| Organic Acids | 0.57 |
| Proteins | 0.26 |
| Ash | 0.17 |
| | 97.79% |

Water content of honey is a most important characteristic. Typically, processed honey has a solids content of from about 77% to about 85% (wt). Within this range, the dextrose-water ratio of the honey is above about 1.7 and after a period of time, the honey will tend to granulate or crystallize. A maximum water content limit of 18.6% is permitted for U.S. Grades A and B. U.S. Grade C honey for reprocessing may contain up to 20% water. Greater percentages of water assigns a Grade D. Honey with less than about 17.1% water generally will not ferment within a year regardless of its yeast count.

Gums, also called hydrocolloids, belong to the polysaccharide family. Polysaccharides are polymers of simple sugar building blocks. Gums function as thickeners, stabilizers, suspending agents, gelling agents, film formers, aerating agents, flocculants, binders, emulsifiers, lubricants and texturing and structuring agents. They are primarily used to thicken or gel water and are frequently classified into two groups: thickeners and gelling agents. The major gelling agents are gelatin, starch, alginate, pectin, carrageenan, agar and methylcellulose.

The term "gelling agent" will be understood to refer generally to a gum's ability to convert water from a flowable liquid to a demoldable solid or gel. Gellan gum is a polysaccharide gelling agent produced by bacterial fermentation.

As a confection, natural honey is generally considered to more closely resemble a syrup than a jelly. In many service settings, the viscous fluid nature of the natural food is inconvenient or difficult to handle. There are a few prior art teachings of processes to either increase the viscosity of the natural fluid to an extremely stiff syrup or to gel the substance. However, such prior art attempts to modify the physical texture of honey have produced products that undesirably depart from the richly flavored natural substance.

It is, therefore, an objective of the present invention provide a gelled honey product having an excellent flavor release faithful to the natural substance.

Another object of the invention is to provide a honey product in the form of a medium soft gel which breaks easily with pressure, spreads easily on soft breads and retains natural honey palatability.

A further object of the invention is to teach a novel process for preparing a gelatinized honey product.

BRIEF SUMMARY OF THE INVENTION

In a preferred embodiment, the honey composition of the present invention comprises from about 80% to about 89% wt. constituency of natural honey having from about 77% to about 85% wt. soluble solids. The honey is heated uniformly and independently to about 160° F.

Collaterally, a gellan gum solution is prepared by first mixing with from about 10% wt. to about 19% wt. deionized water at room temperature (55°–75° F.) about 0.05% wt. to about 0.16% wt. anhydrous sodium citrate, with stirring, until sodium citrate is completely dissolved. Then from about 0.10% wt. gellan gum to about 0.30% wt. gellan gum is added by turbulent mixing. Following mixture, the solution is rapidly heated to boiling (approximately 212° F.).

In accordance with the present invention, the heated gum solution is gently blended with the heated honey, as by stirring and, while hot, poured into molding vessels. The blend has been observed to cool to a medium soft, clear gel which breaks easily with pressure and exhibits full bodied honey flavor. The soluble solids content of the finished product is 68°–74° Brix. The gel is responsive to heating, does melt and noticeably softens under microwave or convective heating energy.

DETAILED DESCRIPTION OF THE INVENTION

The present invention composition predominately comprises honey, gum and water. Natural honeys are preferred and suitable natural honeys are those having from about 77% to about 85% (wt.) (77° to 85° Brix) soluble sugar solids as read by refractometer. Particularly preferred are natural honeys having from about 80% to about 82% soluble solids. Honey of less than about 80% soluble sugar solids will generally require significantly reduced quantities of gum to gel.

Demineralized water that is substantially free of monovalent and divalent ions is preferred. Although the minor presence of calcium and sodium ions do not prevent product gelling, their presence is believed to impact the gelling characteristics.

A gellan gum well suited for the present invention is available from Kelco of San Diego, Calif. under the tradename KELCO GEL F. The KELCO GEL F gellan gum is believed to be provided by inoculating a formulated fermentation medium with the Pseudomonas elodea (ATCC 31461) microorganism.

Small quantities of dilute citric acid (15% solution, for example) may be added to the blend of honey and gum solution to improve the gel structure and the flavor authenticity. Other flavor enhancements such as cinnamon may be added as desired.

The following nonlimiting Examples illustrate in greater detail preferred embodiments of the invention and its procedure of practice:

EXAMPLE I

A gelatinized honey composition was prepared with Grade A white honey of 80°–82° Brix, KELCO GEL F gellan gum, cool distilled water and 15% solution citric acid. An 19.0376% wt. of 70° F. distilled water was mixed with 0.1683% wt. of gellan gum and 0.112% wt. anhydrous sodium citrate. The mixing of the gum and the citrate into the water was carried out with an energetic shear action. Subsequently, the mixture was heated to 212° F.

At the same time, 80.3869% wt. of the white honey was heated uniformly to 160° F. The hot gellan gum solution was added to the 160° F. honey. Then 0.2952% wt. of a 15% solution of citric acid was added.

The warm mixture was poured into molding vessels and allowed to cool naturally. The cooled product was observed to be a medium soft gel which broke easily with palate pressure and spread smoothly and easily on soft bread. The flavor and aroma were observed to be that of natural honey. The soluble solids content of the finished product is 68°–74° Brix.

EXAMPLE II

A gelatinized cinnamon honey composition was prepared with Grade A white honey of 80°–82° Brix, KELCO GEL F gellan gum, 70° F. distilled water, cinnamon powder and cinnamon oil. A 17.2521% wt. of cool distilled water received a 0.1056% wt. of anhydrous sodium citrate and a 0.1584% wt. of gellan gum with turbulent mixing. The well mixed gum-citrate solution was heated to 212° F.

Simultaneous with the gum-citrate solution heating, an 82.4419% wt. of honey, a 0.0395% wt. of cinnamon powder and a 0.0025% wt. of cinnamon oil were blended together and uniformly heated in a water bath to 160° F. The hot gum solution was added to the warm honey and the mixture stirred until uniform.

The mixture was poured into molding vessels and allowed to cool, forming a medium soft gel and excellent flavor release. The soluble solids content of the finished product is 68°–74° Brix.

EXAMPLE III

A gelatinized orange blossom honey composition was prepared with Grade A orange blossom honey of 80°–82° Brix, KELCO GEL F gellan gum and 70° F. distilled water. A 0.1200% wt. of anhydrous sodium citrate and a 0.1800% wt. of gellan gum were turbulently mixed with shear action into a 11.9854% wt. of distilled water. The well mixed solution was then heated to 212° F.

The 87.7146% wt. honey was heated separately in a water bath to 160° F. before the boiling gum solution is added to the warm honey and gently blended. The warm, blended product was poured into molding vessels and cooled. The soluble solids content of the finished product is 68°–74° Brix.

Having fully disclosed the presently preferred embodiments of my invention, those of ordinary skill in the art will find other flavors and applications for the product.

I claim:

1. A gelatinized honey composition having a soluble solids content of about 68° to about 74° Brix, said composition comprising from about 80% to about 89% wt. natural honey, from about 0.05% wt. to about 0.16% wt. anhydrous sodium citrate, from about 0.10% to about 0.30% wt. gellan gum and from about 10% to about 19% wt. water wherein said honey composition exhibits full bodied honey flavor.

2. A honey composition as described by claim 1 wherein said natural honey comprises from about 77% to about 85% soluble solids.

3. A honey composition as described by claim 2 that additionally comprises about 0.29% wt. of about 15% solution citric acid and the natural honey comprises approximately 80% wt. of about 80° to about 82° Brix white honey.

4. A honey composition as described by claim 2 that comprises about 0.0025% wt. cinnamon oil and about 0.039% wt. cinnamon powder and the natural honey comprises approximately 82.5% of 80° to 82° Brix white honey.

5. The food product of the process comprising the steps of:

turbulently combining from about 0.05% wt. to about 0.16% wt. anhydrous sodium citrate and from about 0.10% to about 0.30% wt. gellan gum with from about 10% to about 20% wt. cool water to form a gum-citrate solution;

rapidly heating said gum-citrate solution to about 212° F.;

substantially uniformly heating from about 80% to about 89% wt. natural honey to at least about 160° F. independently of said gum-citrate solution; and, combining the heated gum-citrate solution and the heated honey with a gentle blending action, wherein said food product produced by said process comprises from about 80% to about 89% wt. natural honey, from about 0.05% wt. to about 0.16% wt. anhydrous sodium citrate, from about 0.10% to about 0.30% wt. gellan gum and from about 10% to about 19% wt. water and wherein said food product exhibits full bodied honey flavor.

6. The food product of the process described by claim 5 wherein said natural honey comprises from about 77% to about 85% soluble solids.

7. The food product of the process described by claim 6 that further comprises about 0.29% wt. of about 15% solution citric acid and the natural honey comprises approximately 80% wt. of about 80° to about 82° Brix white honey.

8. The food product of the process described by claim 6 that further comprises about 0.0025% wt. cinnamon oil and about 0.039% wt. cinnamon powder and the natural honey comprises approximately 82.5% of about 80° to about 82° Brix white honey.

* * * * *